US010853529B2

(12) United States Patent
Michiels

(10) Patent No.: US 10,853,529 B2
(45) Date of Patent: Dec. 1, 2020

(54) SYSTEMS AND METHODS OF IMPROVING BUILDABILITY IN ADDITIVE MANUFACTURING

(71) Applicant: MATERIALISE N.V., Leuven (BE)

(72) Inventor: Manuel Michiels, Leuven (BE)

(73) Assignee: MATERIALISE N.V., Leuven (BE)

( * ) Notice: Subject to any disclaimer, the term of this patent is extended or adjusted under 35 U.S.C. 154(b) by 0 days.

(21) Appl. No.: 16/337,727

(22) PCT Filed: Sep. 28, 2017

(86) PCT No.: PCT/US2017/054100
§ 371 (c)(1),
(2) Date: Mar. 28, 2019

(87) PCT Pub. No.: WO2018/064379
PCT Pub. Date: Apr. 5, 2018

(65) Prior Publication Data
US 2020/0034496 A1    Jan. 30, 2020

Related U.S. Application Data

(60) Provisional application No. 62/402,867, filed on Sep. 30, 2016.

(51) Int. Cl.
| | | |
|---|---|---|
| *G06F 30/00* | (2020.01) | |
| *G06T 19/20* | (2011.01) | |
| *G06F 119/18* | (2020.01) | |
| *G06T 19/00* | (2011.01) | |

(52) U.S. Cl.
CPC .............. *G06F 30/00* (2020.01); *G06T 19/20* (2013.01); *G06F 2119/18* (2020.01)

(58) Field of Classification Search
None
See application file for complete search history.

(56) References Cited

U.S. PATENT DOCUMENTS

| | | | | |
|---|---|---|---|---|
| 2016/0144574 | A1* | 5/2016 | Eilken | G06T 19/20 264/129 |
| 2018/0236551 | A1* | 8/2018 | Michiels | B22F 3/1055 |
| 2018/0240263 | A1* | 8/2018 | Courter | B33Y 50/02 |

FOREIGN PATENT DOCUMENTS

| | | |
|---|---|---|
| WO | 2015022341 A3 | 2/2015 |

OTHER PUBLICATIONS

Brackett, D. et al., "Topology Optimization for Additive Manufacturing". Aug. 17, 2011. pp. 348-362.
Leary, Martin et al., "Selective laser melting (SLM) of AlSi12Mg lattice structures". Materials and Design. Elsevier. Amsterdam, Netherlands. 98. Mar. 6, 2016. pp. 344-357.
Wang, Weiming et al., "Cost-effective Printing of 3D Objects with Skin-Frame Structures". ACM Transactions on Graphics. 32(6). Nov. 1, 2013. pp. 1-10.
Wu, Rundong et al., "Printing Arbitrary Meshes with a 5DOF Wireframe Printer". ACM Transactions on Graphics. 35 (4). Jul. 11, 2016. pp. 1-9.

\* cited by examiner

*Primary Examiner* — Michael J Cobb
(74) *Attorney, Agent, or Firm* — Patterson + Sheridan, LLP

(57) ABSTRACT

Systems and methods for designing lattice structures in a way that ensures their buildability when manufactured in an additive manufacturing environment are disclosed.

12 Claims, 13 Drawing Sheets

SYSTEMS AND METHODS OF IMPROVING BUILDABILITY IN ADDITIVE MANUFACTURING

CROSS-REFERENCE TO RELATED APPLICATIONS

This application claims the benefit of U.S. Provisional Patent Application Ser. No. 62/402,867 filed Sep. 30, 2016, which is hereby expressly incorporated by reference in its entirety.

BACKGROUND OF THE INVENTION

Field of the Invention

This application relates to improving the buildability of 3-D printed objects. More particularly, this application relates to systems and methods for aiding in designing lattice structures in a way that ensures their buildability when manufactured in an additive manufacturing environment.

Description of the Related Technology

A key advantage and benefit of 3D printing and other additive manufacturing techniques is the ability to build lattices and other light weight structures. Additive manufacturing using light weight structures such as lattices promotes material savings and can also do so without severely impacting the strength of a manufactured part. Lattice structures are also used to promote bone ingrowth in medical implants or they can be aesthetically pleasing and encompass intricate and creative designs. Although the use of lattice structures has significant benefits, additive manufacturing of lattice structure also presents certain challenges. In particular, it can be difficult at the design stage to know whether a particular designed structure can be successfully built. Accordingly, improvements in ensuring buildability of lattice structure designs are needed.

SUMMARY

Certain embodiments of the present disclosure provide a method of analyzing a graph representing a three-dimensional structure to identify non-self-supporting areas. The method includes detecting a line in the graph having an angle with respect to an XY plane that does not meet a threshold angle, the line having a graph line length. The method further includes determining one of a beam thickness of a neighboring graph line of the detected line and a connection thickness of a connection between the neighboring graph line and the detected line. The method further includes calculating, based on the graph line length and the one of the beam thickness and the connection thickness, an actual length of the detected line. The method further includes determining, based on the actual length, if the detected line meets buildability constraints.

Certain embodiments of the present disclosure provide a computer-readable medium having computer-executable instructions stored thereon, which, when executed by a processor of a computing device, cause the computing device to perform a method of analyzing a graphical representation of a three-dimensional structure to identify non-self-supporting areas. The method includes detecting a line in the graph having an angle with respect to an XY plane that does not meet a threshold angle, the line having a graph line length. The method further includes determining one of a beam thickness of a neighboring graph line of the detected line and a connection thickness of a connection between the neighboring graph line and the detected line. The method further includes calculating, based on the graph line length and the one of the beam thickness and the connection thickness, an actual length of the detected line. The method further includes determining, based on the actual length, if the detected line meets buildability constraints.

Certain embodiments of the present disclosure provide a computing device for analyzing a graph representing a three-dimensional structure to identify non-self-supporting areas. The computing device includes a memory and a processor. The processor is configured to detect a line in the graph having an angle with respect to an XY plane that does not meet a threshold angle, the line having a graph line length. The processor is further configured to determine one of a beam thickness of a neighboring graph line of the detected line and a connection thickness of a connection between the neighboring graph line and the detected line. The processor is further configured to calculate, based on the graph line length and the one of the beam thickness and the connection thickness, an actual length of the detected line. The processor is further configured to determine, based on the actual length, if the detected line meets buildability constraints.

Certain embodiments of the present disclosure provide a computing device for analyzing a graph representing a three-dimensional structure to identify non-self-supporting areas. The computing device includes means for detecting a line in the graph having an angle with respect to an XY plane that does not meet a threshold angle, the line having a graph line length. The computing device further includes means for determining one of a beam thickness of a neighboring graph line of the detected line and a connection thickness of a connection between the neighboring graph line and the detected line. The computing device further includes means for calculating, based on the graph line length and the one of the beam thickness and the connection thickness, an actual length of the detected line. The computing device further includes means for determining, based on the actual length, if the detected line meets buildability constraints.

BRIEF DESCRIPTION OF THE DRAWINGS

FIG. 13A illustrates the lattice. FIG. 13B shows a close-up on one node, and the axes used to determine if the beams are non-conforming, or self-supporting.

DETAILED DESCRIPTION OF CERTAIN INVENTIVE EMBODIMENTS

Figure 1:
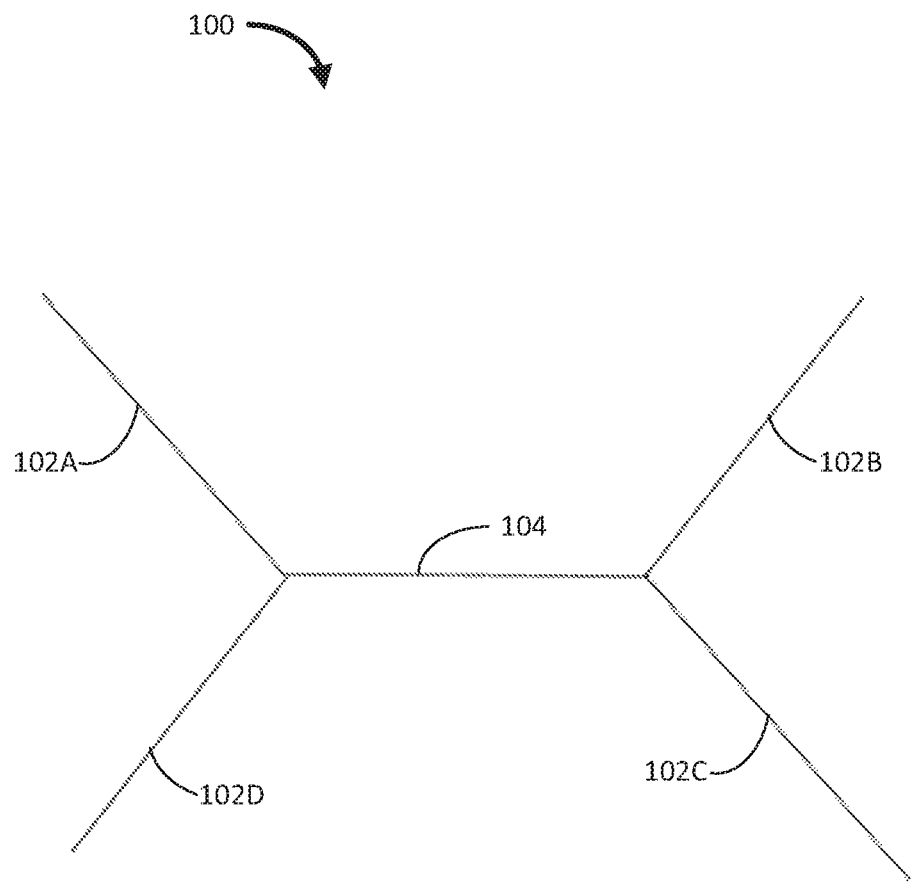
FIG. 1 is an example of a graphical representation of a lattice structure according to one or more embodiments.

Embodiments of this application relate to systems and methods for detecting problematic lattice structure designs, and correcting those designs to ensure their buildability in an additive manufacturing device. For example, an object to be built using additive manufacturing techniques may include one or more lattice structures. A lattice structure may refer to a structure that includes a number of gaps (e.g., geometrically shaped gaps) in the material. Accordingly, the lattice structure may resemble a screen or other intersecting framework. In some aspects, the lattice structure includes substantially straight lengths (also referred to as "beams") of build material, that form a pattern (e.g., repeating pattern) of gaps. The point of intersection of beams may be referred to as a node. For example, a honeycomb structure may be an example of a lattice.

The inventors have identified various problems that arise in taking lattice structures from design to manufacturing. Designers often have complete freedom in designing a lattice structure. Moreover, when a lattice structure is generated using finite element analysis (FEA), the FEA does not consider buildability of the generated structure. As a result, problems that arise during the manufacturing of lattice structures often include inadequate support for long horizontal lines or other regions that are not self-supporting, such as, down-facing dangling ends on the outer edges of the structure.

In order to solve these and other problems identified by the inventors, systems and methods for detecting and correcting non-buildable features of lattices are disclosed. In general, these inventive systems and methods involve receiving a digital graphical representation of a lattice structure, such as described in International Patent Publication No. WO 2015/022341, which is hereby incorporated by reference in its entirety. In some embodiments, the graphical representation of the lattice structure includes a "skeleton" representation of the lattice structure design before the build process is performed. In particular, the graphical representation may include graph lines that reflect the position and orientation of the actual build material (e.g., beams) that is used to form the lattice structure when manufactured (e.g., using additive manufacturing techniques). However, the graphical representation may not represent the amount (e.g., thickness, actual dimensions, etc.) of build material along each of the graph lines.

Accordingly, the graphical representation may not fully represent the dimensions of the beams of the lattice structure. Rather, the graphical representation of the lattice structure may only give an estimated indication of the length along which the build material is to be used to form the lattice structure during manufacturing, as further discussed below.

In some embodiments, in order to ensure buildability of the lattice structure, a computing device analyzes the digital graphical representation of the lattice structure to identify potential areas (e.g., graph lines, beams, etc.) of the digital graphical representation that are potentially not self-supporting or may have errors when built using additive manufacturing techniques. For example, the computing device analyzes the digital graphical representation of the lattice structure to identify any graph lines that that do not meet a threshold angle with respect to an XY plane of the lattice structure. In particular, in additive manufacturing, objects are typically built on a layer by layer basis onto a build platform, with a particular orientation of the object during the build process with respect to the build platform. The XY plane refers to any plane corresponding to (e.g., parallel to) a single layer and that is parallel to the build platform. The Z axis is the axis perpendicular to the build platform. Accordingly, the angle for a graph line with respect to an XY plane of the lattice structure is the angle formed between the graph line and the XY plane. For graph lines parallel to the XY plane, the angle formed is zero. For graph lines that intersect the XY plane, the angle formed is the lesser of the two adjacent angles formed by the intersection. The angle for the graph line may be called the "overhang" angle or self-supporting angle, and is indicative of the angle at which a structure is self-supporting during the build process. For example, if the overhang angle of the graph line is above the threshold angle, the graph line may be self-supporting and therefore the graph line is considered manufacturable. Such graph lines may be predominantly or substantially vertical lines with respect to the build platform.

The computing device determines whether any such angles of graph lines do not meet the threshold angle (e.g., the angles of the graph lines are less than the threshold angle, such as horizontal graph lines representing horizontal beams). Such graph lines may be predominantly or substantially horizontal lines with respect to the build platform. Such graph lines that do not meet the threshold angle may be referred to as non-conforming graph lines. In some embodiments, the computing device then further analyzes any non-conforming graph lines to determine whether they are manufacturable in the context of the lattice structure.

For example, in addition to the angle of the graph line, the length and thickness of the actual build material (e.g., beams) that forms the graph line play a significant role in whether the non-conforming graph line will be self-supporting during an additive manufacturing build process. For example, the shorter the beams of a lattice structure, the more likely it is to be self-supporting. Graph lines provide a representation of the length of the build material for the graph line (e.g., the length of an actual beam, such as a horizontal beam, of a manufactured lattice structure). However, as discussed, graph lines are only a mathematical representation of the lattice structure to be built. In particular, the graph lines do not indicate the beam thickness (e.g., thickness of the build material along the graph line) for the graph line. The beam thickness information, rather, is hidden and only made available at a later stage in the design and manufacturing process, such as described in International Patent Publication No. WO 2015/022341. In particular, the beam thickness and the orientation of neighboring beams as represented by neighboring graph lines, can significantly impact the buildability of beams represented by graph lines that do not meet the threshold angle. Accordingly, the systems and methods disclosed herein determine whether one or more beams that are represented by a non-conforming graph line (e.g., non-conforming beams) are self-supporting by, in addition to considering the length (e.g., the horizontal component of the length of the non-conforming graph line that is parallel to the XY plane) of the graph line representing the beam, analyzing beam thickness and/or orientation of neighboring beams. Neighboring beams may refer to beams that connect to (e.g., share a node with) the given beam. Neighboring down-facing beams may refer to beams that extend in a downward direction to a build platform with respect to the given beam. Neighboring up-facing beams may refer to beams that extend in an upward direction away from a build platform with respect to the given beam. In some embodiments, if a particular beam is indicated as non-conforming, and neighboring down-facing beams are also indicated as being non-conforming, the computing device may add the length of each of the particular beam and any neighboring down-facing beams that are non-conforming (e.g., and their non-conforming down-facing neighbors as well until a conforming down-facing neighbor is reached) to determine the corresponding length of the overhang for the beams. In some embodiments, if there are no neighboring down-facing beams (e.g., only neighboring up-facing beams) for a beam represented by a graph lines that does not meet the threshold angle, the beam may be identified as a not self-supporting.

In some embodiments, if a particular beam is indicated as non-conforming, and neighboring up-facing beams are also indicated as being non-conforming, the computing device may add the length of each of the particular beam and any neighboring up-facing beams that are non-conforming (e.g., and their non-conforming up-facing neighbors as well until a conforming up-facing neighbor is reached) to determine the corresponding length of the overhang for the beams.

A computing device may use the procedures indicated herein to determine whether a particular non-conforming beam is self-supporting or not. In some embodiments, the computing device may provide an indication (e.g., in a graphical user interface on a screen) to a user that a beam is self-supporting or not. Further, in some embodiments, the computing device may correct (e.g., automatically) any beams identified as not self-supporting.

In some embodiments, the computing device determines an actual length of the structure (e.g., beam) that will take form during the actual manufacturing process for a non-conforming graph line. For example, in some embodiments, the computing device subtracts values based on the beam thicknesses (e.g., half the beam thickness (beam diameter), the beam thickness, a beam radius (e.g., beamdiamter/2*cos (alpha) where alpha is the angle between the non-conforming beam and the neighboring beam), etc.) of the neighboring beams of the non-conforming beam from the length of the corresponding non-conforming graph line (also referred to as "graph length) of the non-conforming beam to determine an actual length of the structure (e.g., actual beam length) that will take form during the actual manufacturing process. Based on the type of material being used for the build, the computing device compares the actual length of the beam structure to a predefined maximum self-supporting beam length. If the actual beam length exceeds that predefined maximum self-supporting beam length, the computing device may identify the non-conforming beam as non-compliant, or indicated as not self-supporting.

In some embodiments, instead of using the values based on the beam thickness of neighboring beams, the computing device may take connection thickness into account when analyzing the buildability of a non-conforming beam. In particular, in some aspects, connection thickness may be used to determine if a non-conforming beam is self-supporting or not when such connection thickness information is available, otherwise values based on the beam thickness of neighboring beams are used. In particular, a manufactured (e.g., using additive manufacturing) part inherently has a connection thickness where two beams intersect. This connection thickness can act as a fillet (e.g., a rounding of a corner) that can reinforce areas of high stress in the design. Such connection thickness information may be defined at a node coupling a non-conforming beam to its neighboring beams in the digital graphical representation of the lattice structure. For example, at a given node, the connection thickness may include a thickness of the node or a radius of a sphere at the node that corresponds to the thickness of the build material used at the node to build the lattice structure. When connection thickness is used as a criterion, the computing device calculates the actual beam length (e.g., actual overhang length) as compared to the graph length of the non-conforming beam as reduced by the connection thickness of each node shared with each neighboring beam. The computing device can compare the actual beam length to a predefined maximum to determine the buildability of that non-conforming beam. If the actual beam length exceeds that predefined maximum self-supporting beam length, the non-conforming beam may be identified by the computing device as non-compliant, or indicated as not self-supporting.

In some embodiments, the computing device may visually alter graph lines corresponding to non-compliant or not self-supporting beams in the design to help the user identify them within the graphical representation of the design. Further, in some embodiments, the computing device may correct (e.g., automatically) any beams identified as non-compliant or not self-supporting. For example, in some embodiments, the computing device may adjust (e.g., increase) the connection thickness at nodes shared with neighboring beams in order to reduce the actual length of the non-conforming beam. In addition or alternatively, the computing device may adjust the design by moving nodes closer together to reduce the graph length of the non-compliant beam. In some embodiments, additionally or alternatively, the computing device may adjust (e.g., increase) the beam thickness of neighboring beams in order to reduce the actual length of the non-conforming beam. In these embodiments, the angles of neighboring graph lines (e.g., of neighboring beams) may change due to the reduced length of the non-compliant beam. Accordingly, the computing device may (e.g., in an iterative fashion) analyze the new angles again to ensure compliance with buildability specifications.

A non-conforming or non-compliant beam may be a horizontal beam in a lattice structure. The non-compliant beam may also be a beam in the lattice structure with an angle that is below the overhang or self-supporting angle. In some embodiments, the orientation of the lattice structure in 3D space determines the angle of the beams relative to the xy plane. For example, a first lattice structure in a first orientation may have non-conforming beams that are horizontal beams in the xy plane, while a second lattice structure in a second orientation may have non-conforming beams that are not horizontal but form an angle below the overhang or self-supporting angle.

The computing device may identify non-conforming or non-compliant beams by evaluating individual beams that are connected at nodes to neighboring beams. A beam and/or a graph line may be represented in space, with a xyz direction. FIG. 13A illustrates an exemplary lattice structure (100) comprising beams connected at nodes. An xy-axis may be superimposed on a node (1301 and 1302). FIG. 13B shows a close-up view of node 1301. If a beam has an angle relative to xy plane that is within a safe zone (1304) determined by the threshold angle alpha (1305), then the beam is likely to be self-supporting. However, if a beam has an angle that falls outside of the safe zone (1304) and in the the detection zone (1306), then the computing device will identify the beam as non-compliant.

In some embodiments, the computing device visually alters graph lines according to a color map. For example, a non-compliant or not self-supporting beam may be colored red to indicate that an adjustment should or will be made to this beam. The color of the beam may be changed after the adjustment has been made. A visual representation of the adjusted beam may be superimposed over a visual representation of the non-compliant or not self-supporting beam. Alternatively, two views of a structure may be presented, one with a non-compliant or not self-supporting beam, and one view with the adjustments that make the beam compliant or self-supporting.

Figure 13:
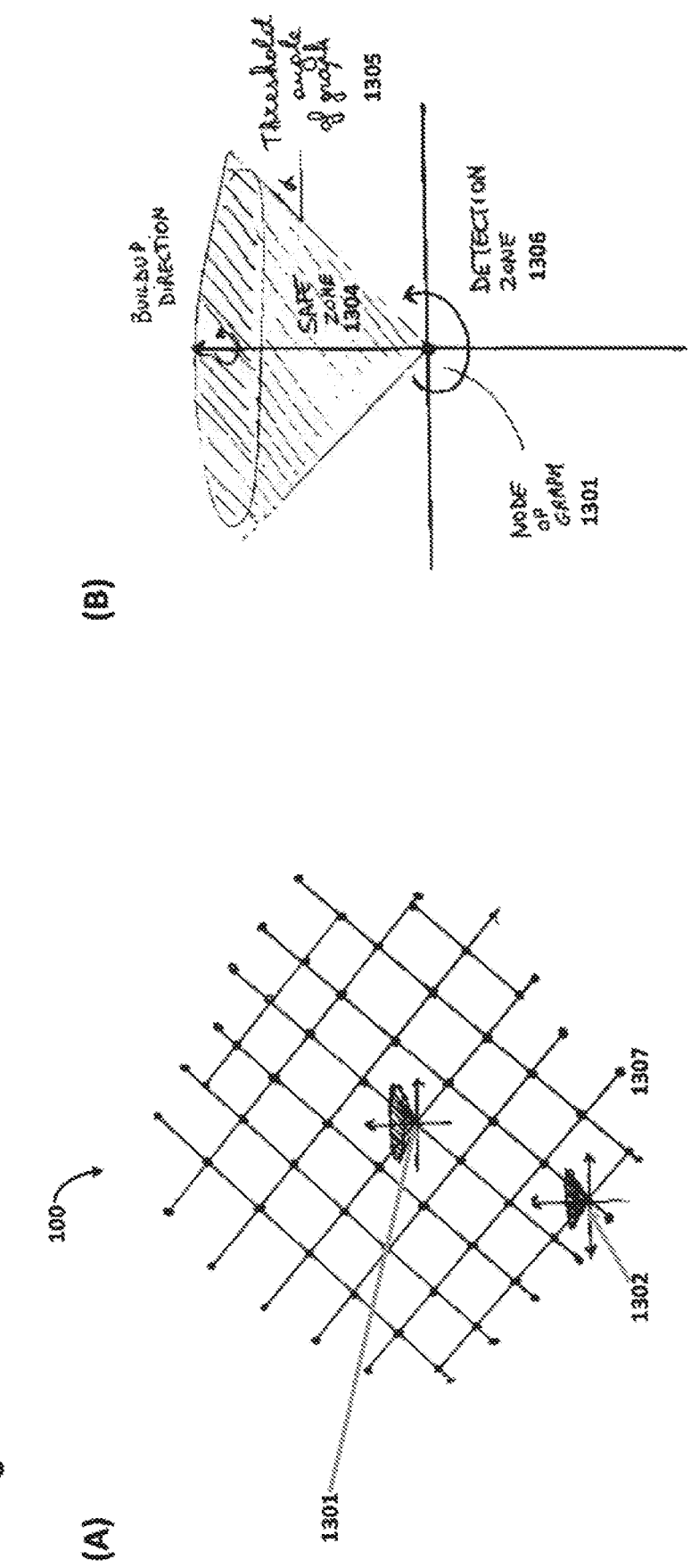
FIG. 13 shows a plurality of beams in a lattice structure, connected to neighboring beams at nodes.

A beam may be connected at a node to one or more neighboring beams. In FIG. 13, nodes 1301 and 1302 connect 4 beams. A beam may be connected at a first end to one or more neighboring beams, and connected at a second end to one or more neighboring beams. Alternatively, a beam may be connected at a first end to one or more neighboring beams but not connected at a second end to a neighboring beam. When a beam is connected only at a first end to neighboring beams but has no neighboring beams at a second end, then the buildability on this beam may be affected by adjusting the neighboring beams at the first end. Accordingly, the effects of adjusting the beam thicknesses, adjusting the connection thickness, and/or moving the single connection point along the beam will only occur at first end of the beam where the neighboring beams are connected.

FIG. 1 is an example of a graphical representation of a portion of a lattice structure according to one or more embodiments. As shown, the graphical representation includes a 2D representation of the lattice structure 100. The vertical axis of the graphical representation corresponds to the Z axis discussed herein. The horizontal axis of the graphical representation corresponds to a cross section of the XY plane as discussed herein. In particular, the graphical representation is an intersection of the lattice structure 100 with a plane parallel to the Z axis. This portion of the lattice structure 100 includes two diagonally facing graph lines on the left side, diagonal beams 102A and 102D. The lattice structure 100 also includes two diagonally facing graph lines on the right side of the structure, diagonal beams 102B and 102C. Each of the pairs of diagonal beams converge at an endpoint (e.g., node) of a non-conforming beam 104 (shown as horizontal), as shown in FIG. 1. Because each of the diagonal beams 102A-102D turns sharply vertical as it extends away from the non-conforming beam 104, each of the diagonal beams 102A-102D has an angle greater than the threshold angle for graph lines. The diagonal beams 102A-102D are easily seen as meeting the buildability constraints because they are self-supporting. In contrast, whether the non-conforming beam 104 is printable or not is unclear in the first instance because the buildability of that particular beam depends on the physical properties (such as beam thickness, connection thickness, etc.) of the diagonal beams 102A-102D represented by the diagonally facing graph lines. Thus, in order to determine whether non-conforming beam 104 is printable in the current design, the physical properties (e.g., dimensions, connection thickness, beam thickness, etc.) of the neighboring beams 102A-102D may be considered.

Figure 2:
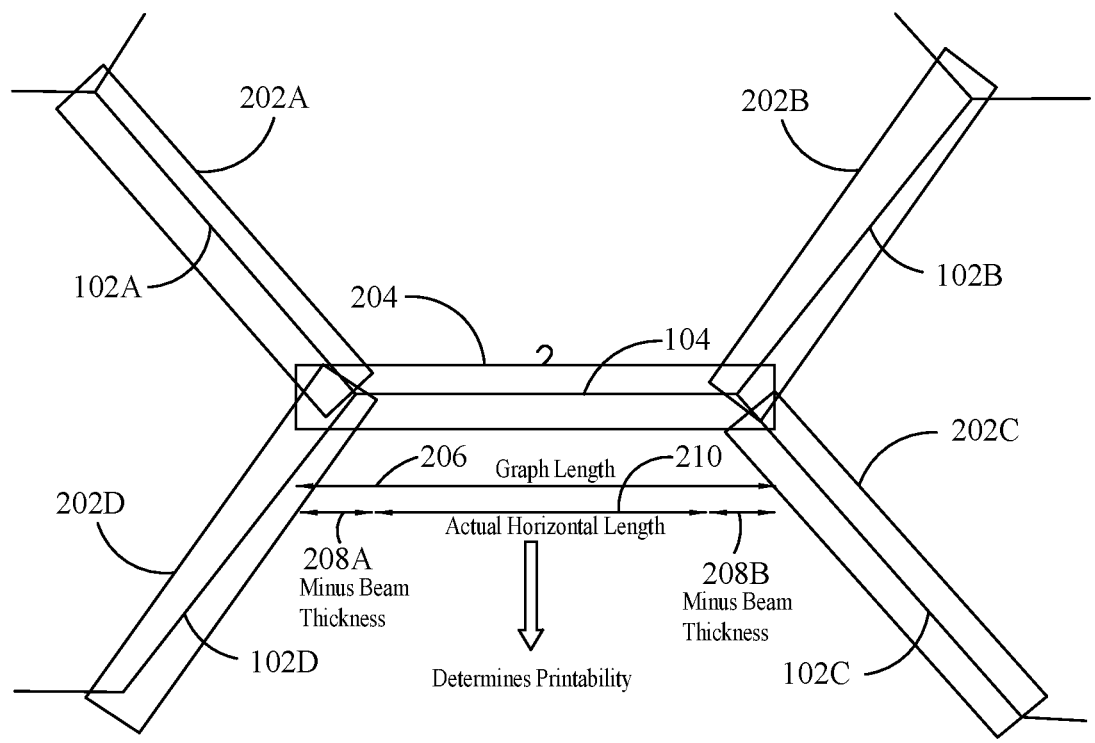
FIG. 2 is an example of the graphical representation from FIG. 1 showing beam thicknesses superimposed on the graphical representation of the lattice structure according to one or more embodiments.

FIG. 2 is an example of the graphical representation from FIG. 1 showing beam thicknesses superimposed on the graphical representation of the lattice structure 100. The beam thicknesses provide a visualization of how the lattice structure will actually physically take shape when manufactured. As shown, the diagonal beam 102A has a superimposed beam thickness 202A. This superimposed beam thickness provides thickness to the graph line which has none. Similarly, each of diagonal beams 102B-102D have a corresponding beam thickness 202B-202D superimposed on the graph. The non-conforming beam 104 has a beam thickness 204—also shown in FIG. 2. As discussed previously, the thickness of neighboring beams can often have an impact on the printability of a non-conforming beam because thickness of the neighboring beams can reduce the actual length of the non-conforming beam. This impact is illustrated in FIG. 2. FIG. 2 shows a graph length 206, which reflects the length of the graph line that represents the non-conforming beam 104. As shown, the graph length 206 extends from each termination point (e.g., node) to the other termination point (e.g., node) on the non-conforming beam 104. However, this distance does not accurately represent the actual length of the non-conforming beam 104 in the physical world, as it does not account for beam thickness of neighboring beams. Accordingly, a second measurement, the actual length 210 is also shown in FIG. 2. The actual length 210 is determined by subtracting values based on the beam thicknesses 208A and 208B from the graph length 206 of the non-conforming beam 104. As can be seen in FIG. 2, the actual length is somewhat less than the graph length, and it is this actual length 210 that is a useful indicator of whether the non-conforming beam 104 will be self-supporting (e.g., meets buildability requirements of the additive manufacturing device) during and after the build process.

Figure 3:
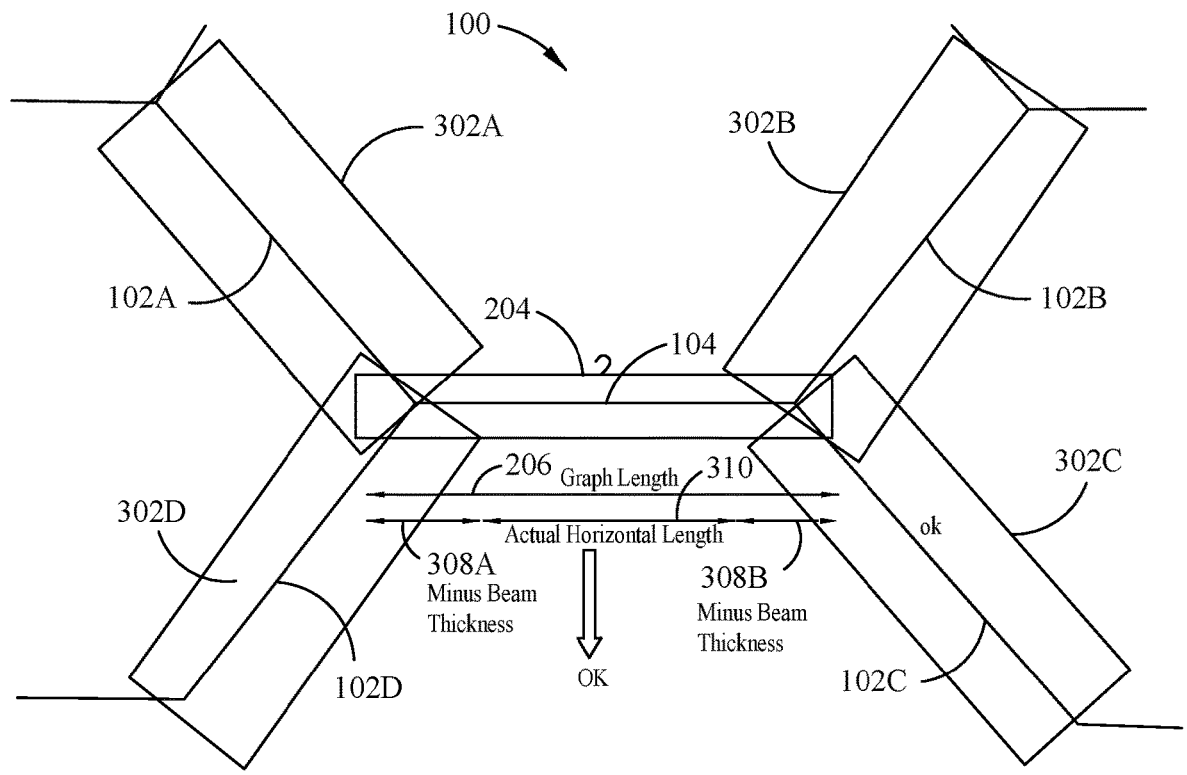
FIG. 3 is an example of the graphical representation from FIG. 1 which illustrates the impact on actual horizontal length the thickness of neighboring beams may have according to one or more embodiments.

FIG. 3 is an example of the graphical representation from FIG. 1 which illustrates how increasing beam thickness in neighboring beams can impact the actual length of a horizontal beam. As shown, the scenario illustrated in FIG. 3 is largely similar to that shown in FIG. 2. However, in FIG. 3, the thickness of each of the diagonal beams 302A-302D is significantly larger than the thickness of the diagonal beams shown in FIG. 2. As a result, the actual length of non-conforming beam 104 is reduced as compared to the actual length of the non-conforming beam in FIG. 2. As was the case in FIG. 2, the actual length is determined by subtracting the values based on the beam thicknesses 308A and 308B from the graph length 206 of the non-conforming beam 104. In this example, the actual length is reduced to such a degree that it falls within the buildability parameters for the machine and building material, and it is accordingly identified as being "ok" in FIG. 3. Thus, as illustrated by the example provided in FIG. 3, when the thickness of neighboring beams is taken into consideration in the context of a graph representation of the lattice, a non-conforming beam that may not initially appeal to be self-supporting may in fact have the structural soundness to be successfully manufactured without any additional support structure.

Beam thickness may be uniformly distributed, for example, where the beam thickness along the entire length of the beam is increased by the same amount. In some embodiments, the beam thickness along the length of the beam is varied. The variation may be a gradient, so that the beam is thickened at a first end one end and the thickness tapers to an area of less or no thickening at a second end. The beam thickness may be configured in a cone shape.

Figure 12:
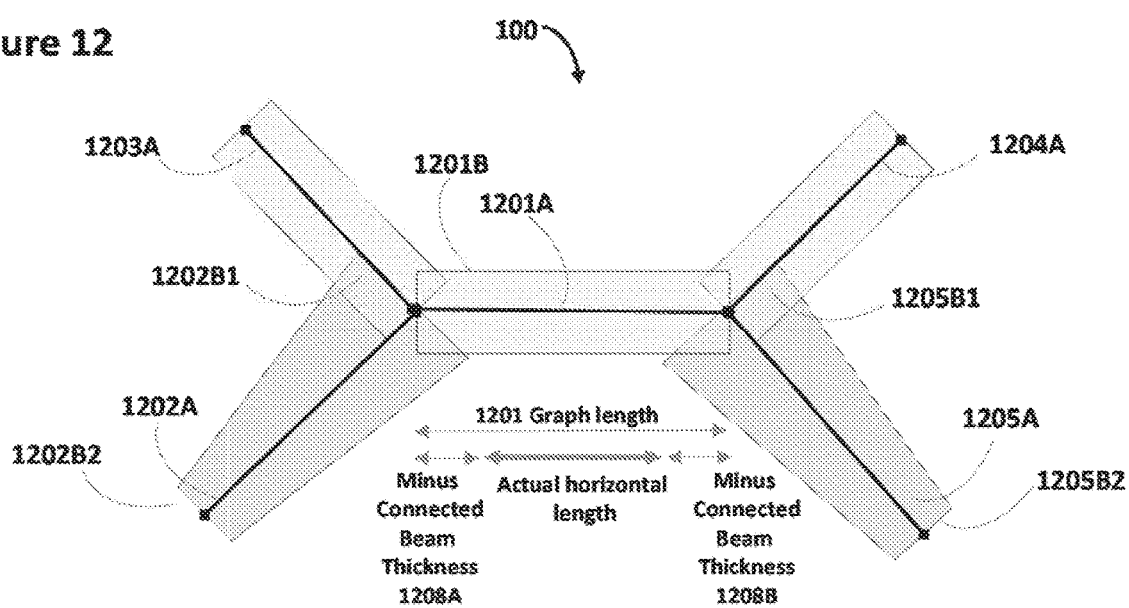
FIG. 12 shows beam thicknesses that are varied along the length of the beams.

FIG. 12 shows an example of a graphical representation of a portion of a lattice structure where the beam thicknesses are not uniform along the length of the beams. As shown, the graphical representation includes a 2D representation of the lattice structure 100. Beams 1203A and 1204A are superimposed with beam thicknesses 1203B1 and 1204B1, each of which are uniformly thick along the length of the beams 1203A and 1204A. In contrast, beams 1202A and 1205A are superimposed with beam thicknesses 1202B2 and 1205B2, which have a first beam thickness at the connection points but taper to a second beam thickness that is less than the first thickness. In some embodiments, the first beam thickness at the connection points may be less than the second beam thickness. In certain embodiments, there is a plurality of beam thicknesses along the length of the beam, wherein one or more beam thicknesses are different from each other, and wherein the beam thicknesses are configured in an ordered manner such as a repeating pattern or a sequential order like a tapering pattern. In certain embodiments, the beam thicknesses in the plurality of beam thicknesses are not configured in an ordered manner. Similar to FIGS. 2 and 3, in FIG. 12 the actual length of the horizontal beam 1201A is determined by subtracting the values based on the beam thicknesses 1208A and 1208B from the graph length 1201 of the non-conforming beam 1201A. In this example, the actual length is reduced to such a degree that it falls within the buildability parameters for the machine and building material, and it is accordingly identified as being "ok" (i.e., printable, buildable, or manufacture-able) in FIG. 12.

Figure 4:
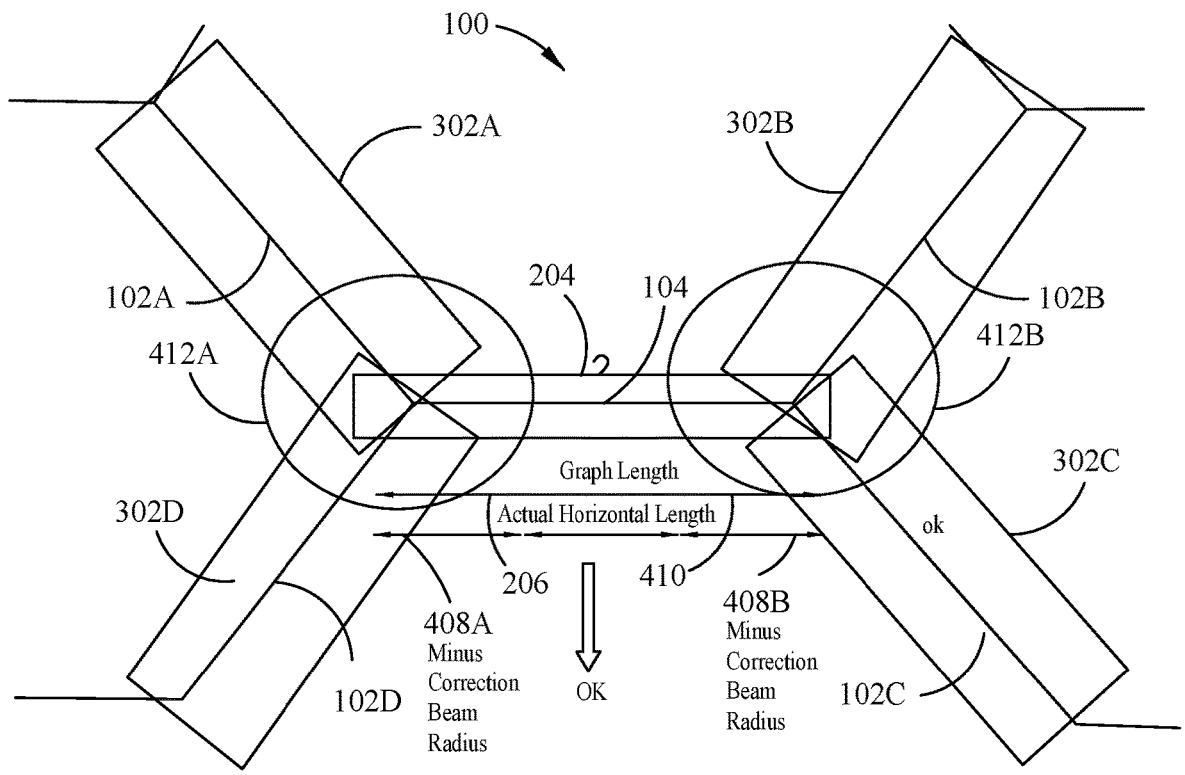
FIG. 4 is an example of the graphical representation from FIG. 1 which shows how connection thickness may be used to determine the actual length of the horizontal beam according to one or more embodiments.

In FIGS. 2, 3, and 12 above, the beam thickness of neighboring beams was utilized to determine an actual length (e.g., actual horizontal length) for the non-conforming beam 104. Beam thickness is merely one way that an actual length for the non-conforming beam in a graph can be determined. Another way that this determination can be made is through the use of connection thickness as a parameter. As explained above, a printed part inherently has a connection thickness where two beams intersect. This connection thickness can act as a fillet (e.g., a rounding of a corner) that can reinforce areas of high stress in the design. FIG. 4 is an example of the graph representation from FIG. 1 which shows how connection thickness may be used to determine the actual length of the non-conforming beam 104. As shown in FIG. 4, the lattice structure 100 includes a non-conforming beam 104 which intersects with diagonal beams 102A-102D, each having corresponding beam thicknesses 302A-302D. Additionally, FIG. 4 illustrates connections 412A and 412B, which are represented as circles (e.g., corresponding to spheres at the nodes) on the graph. The connections 412A and 412B extend well towards the center of the non-conforming beam 104, as reflected by the connection thickness 408A and the connection thickness 408B (e.g., the radii of the connections 412A and 412B, respectively). In this configuration, the actual length 410 of the non-conforming beam 104 is determined by subtracting the total connection thicknesses from the graph length 206. Because the resultant actual length is relatively small, it can be determined that the non-conforming beam 104 is compliant with the applicable buildability constraints.

In some embodiments, the connections may be any geometric shape, including but not limited to a circle, square, triangle, rectangle, diamond, parallelogram, polygon, crescent shape, or ellipse. In the case where the connection has the shape of an ellipse, there may be a non-uniform addition of thickness around the connection, so that connection thickness in one direction is greater than in the other. For example, if a connection like 412A is an ellipse rather than a circle, then there may be a greater connection thickness added in a first direction along the xy-plane than in a second direction along the yz-plane, or vice versa. The non-uniform addition of connection thickness may be used to change the material properties of the lattice structure in which beams are connected, for example, by giving more flexibility in a first direction than in a second direction. The orientation of the ellipse or other non-uniform shape at the connection may also be used the change the material properties. Accordingly, connection thickness can be added to one side of the connection but not the other, or can be added in a ratio. In some embodiments, the connections are asymmetrical shapes.

Figure 5:
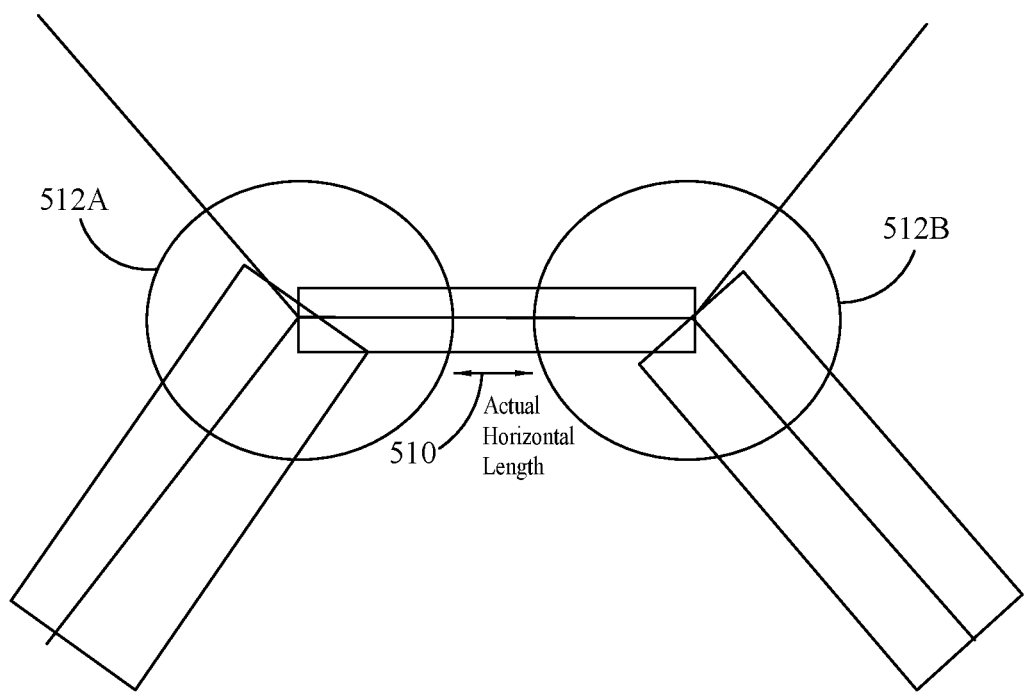
FIG. 5 is an illustration of an increase to the surrounding connection thickness which may be used to make a horizontal beam conform to buildability constraints according to one or more embodiments.

As noted above, the inventors have recognized that certain changes may be made to improve the buildability of a lattice structure design. Turning now to FIG. 5, an illustration of one way to improve the buildability of a lattice structure is provided. In particular, FIG. 5 is an illustration of an increase to the connection thicknesses of connections which may be used to make a non-conforming beam conform to buildability constraints. As shown in FIG. 5, the connections 512A and 512B have been increased in size relative to the connections 412A and 412B shown in FIG. 4. Thus, if the connection thicknesses of the connections shown in FIG. 4 were not sufficient for the non-conforming beam 104 to fall within the buildability constraints of a particular material and machine, the connection thicknesses may be adjusted (e.g., made larger) so that the actual length 510 is reduced even further in the hopes that the modified design will fall within the buildability constraints of the machine and material being used to complete the job.

Figure 6:
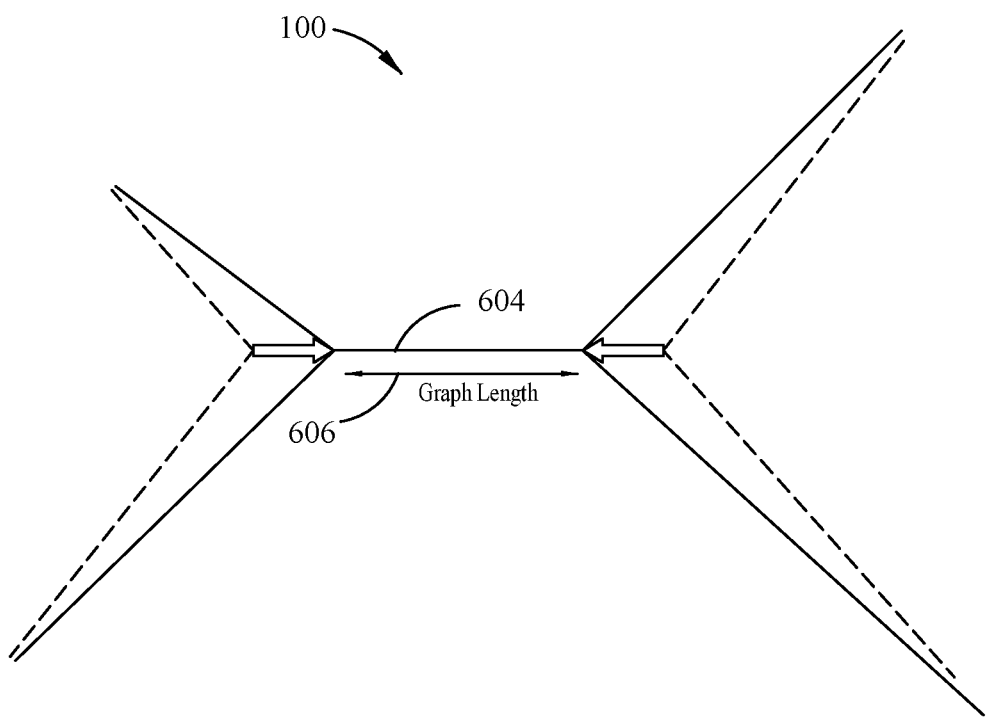
FIG. 6 is an illustration of another adjustment to the graphical representation that may be made to make a lattice structure conform to buildability requirements according to one or more embodiments.

In addition to modifying the connection thickness of connections, another technique may be used to improve the buildability of the horizontal beam. FIG. 6 is an illustration of another adjustment to the graph that may be made to make a lattice structure conform to buildability requirements. As shown, the lattice structure 100 includes a modified beam 604. In this example, the graph length 606 of the beam 604 has been modified by moving the connection points on each side of the beam 604 inward. As a result of the modification of the intersection points between the beam and the neighboring beams, the angle of each of the neighboring beams is made more shallow. Accordingly, the neighboring beams may be rechecked to confirm that they still are above the applicable threshold angle for the machine and materials to be used. Thus, in this particular example, the buildability of the beam 604 may be improved without needing to modify the thickness of the connections or the neighboring beams.

Figure 11:
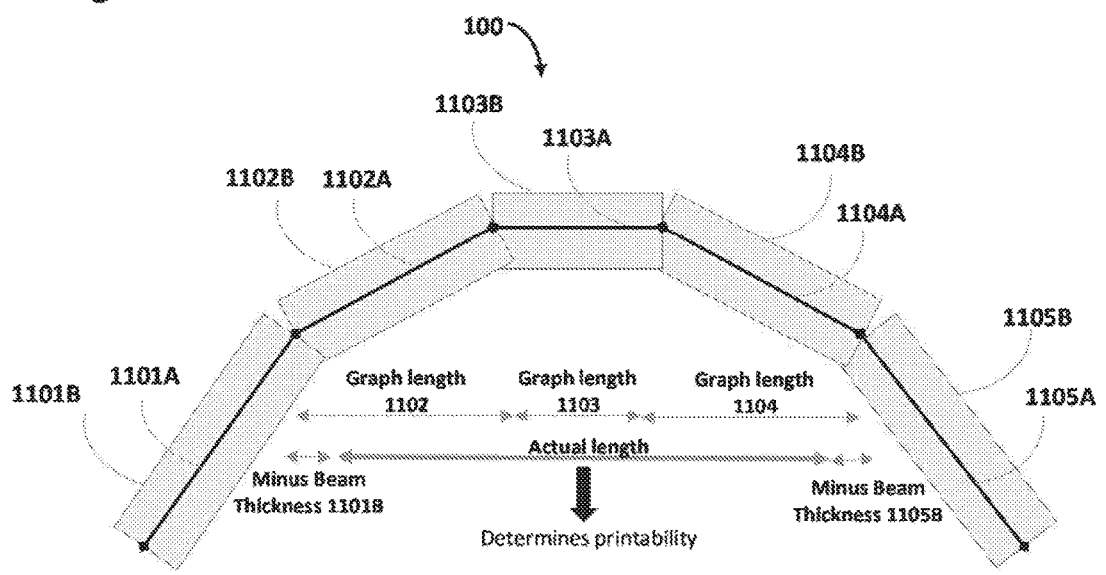
FIG. 11 is an illustration of a line graph comprising a sequence of five connected beams, three of which are each non-conformal. The effective length of the non-conformal region is the sum of the lengths of the three non-conformal beams.

In certain aspects, a lattice structure comprises two or more neighboring beams in sequence that are each non-conforming or non-compliant. In some embodiments, the length of each of the two or more non-conforming beams may be added together to yield an effective length. When a beam thickness is superimposed on each of the beams and/or any neighboring beams, the length of the effective length may be reduced. FIG. 11 illustrates an exemplary lattice comprising 5 beams (1101A, 1102A, 1103A, 1104A, and 1105A), each having a superimposed beam thickness (1101B, 1102B, 1103B, 1104B, and 1105B). Beams 1102A, 1103A, and 1104A are non-conforming because their threshold angle as measured relative to an xy plane indicates that these beams are not self-supporting. Accordingly, the effective length of the non-conforming region is the sum of lengths 1102A, 1103A, and 1104A. This effective length may be reduced by the beam thicknesses of the flanking neighbors (beam 1101A with beam thickness 1101B and beam 1105A with beam thickness 1105B). The actual length of the non-conforming region is the additive length of 1102A, 1103A, and 1104A, minus beam thickness 1101B, and minus beam thickness 1105B. In certain embodiments, the computing device identifies a sequence of non-conforming beams and computes an additive length, and then, where possible, computes an actual length that accounts for beam thicknesses and/or connection thicknesses. The computing device may also move connection points in order to reduce the length of one or more of the non-conforming beams. The computing device may identify a lattice structure that is buildable where the actual length meets buildability requirements, or may identify a lattice structure that will not be buildable because the actual length cannot meet buildability requirements.

Figure 7:
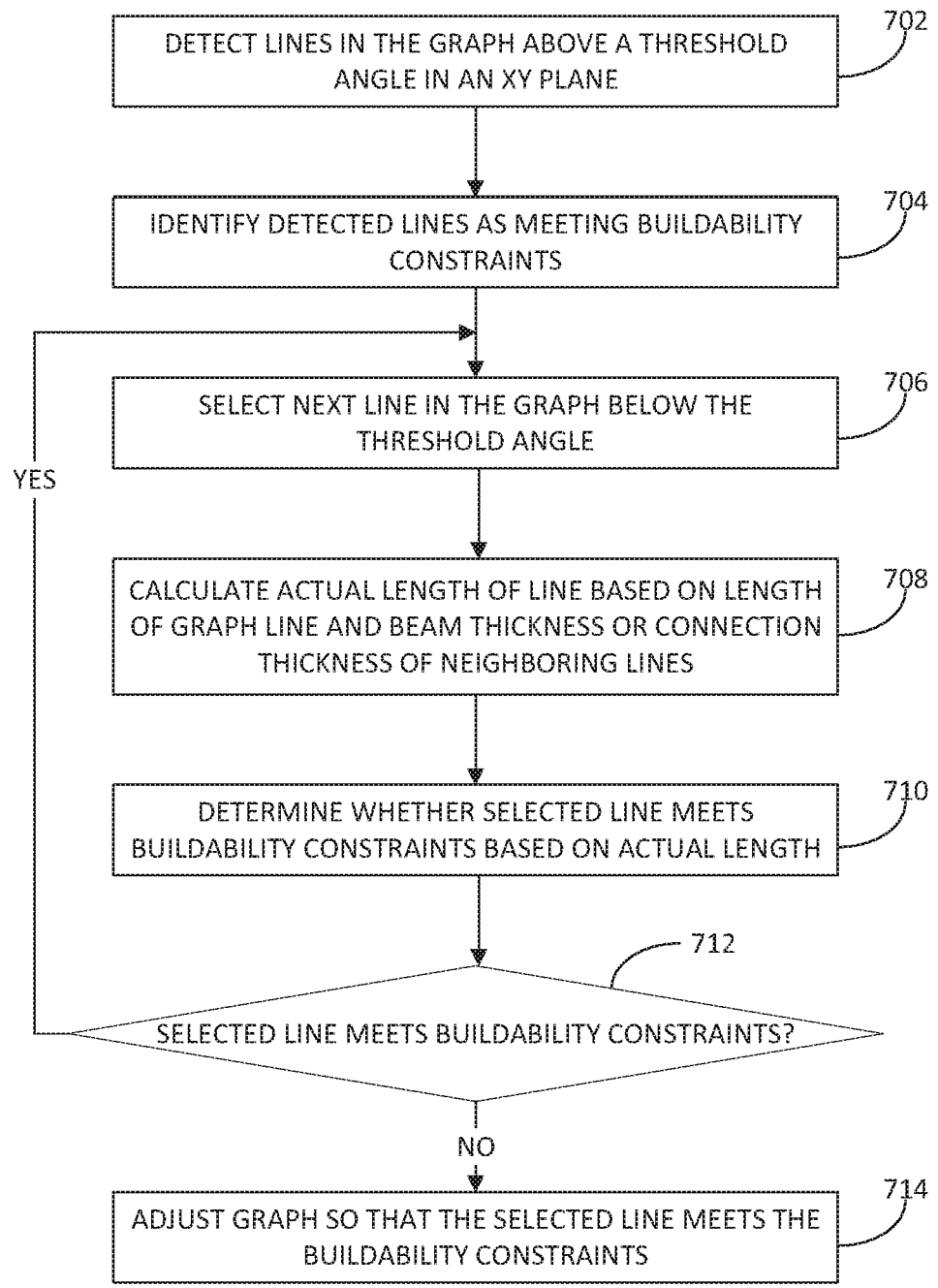
FIG. 7 is a flowchart illustrating a method of analyzing a graphical representation of a lattice structure to identify non-self-supporting areas according to one or more embodiments.

The examples illustrated above may be carried out using computer software executing on a computing device. FIG. 7 is a flowchart illustrating a computer-implemented method of analyzing a graphical representation of a lattice structure to identify non-self-supporting areas according to one or more embodiments. The process begins at block 702, where lines in the graphical representation of the lattice structure which are above the threshold angle in the XY plan are detected. The process then continues to block 704, where the detected lines which meet the buildability constraints are identified as meeting the buildability constraints within the system. The process next moves to block 706. There a line within the graph which is below the threshold angle is selected for consideration as a non-conforming line. The process next moves to block 708, where the actual length of the line is calculated based on the length of the graph line and beam thickness or connection thickness of neighboring lines. Next, at block 710, a determination is made as to whether the selected line meets buildability constraints based on its calculated actual length. The process then moves to decision block 712, where if the selected line meets buildability constraints, the process returns to block 706 where another line is selected for consideration. However, if at decision step 712 the selected line does not meet buildability constraints, the process continues to block 714. There the graph is adjusted (e.g., by the computing device) (or optionally the line is flagged using a visual indication as discussed) so that the selected line can meet the buildability constraints. As noted previously various different adjustments may be made to the graph so that a noncompliant line is made compliant. As noted above, these modifications may include modification of beam thickness, modification of connection thickness, or even modification of graph line endpoints.

Figure 8:
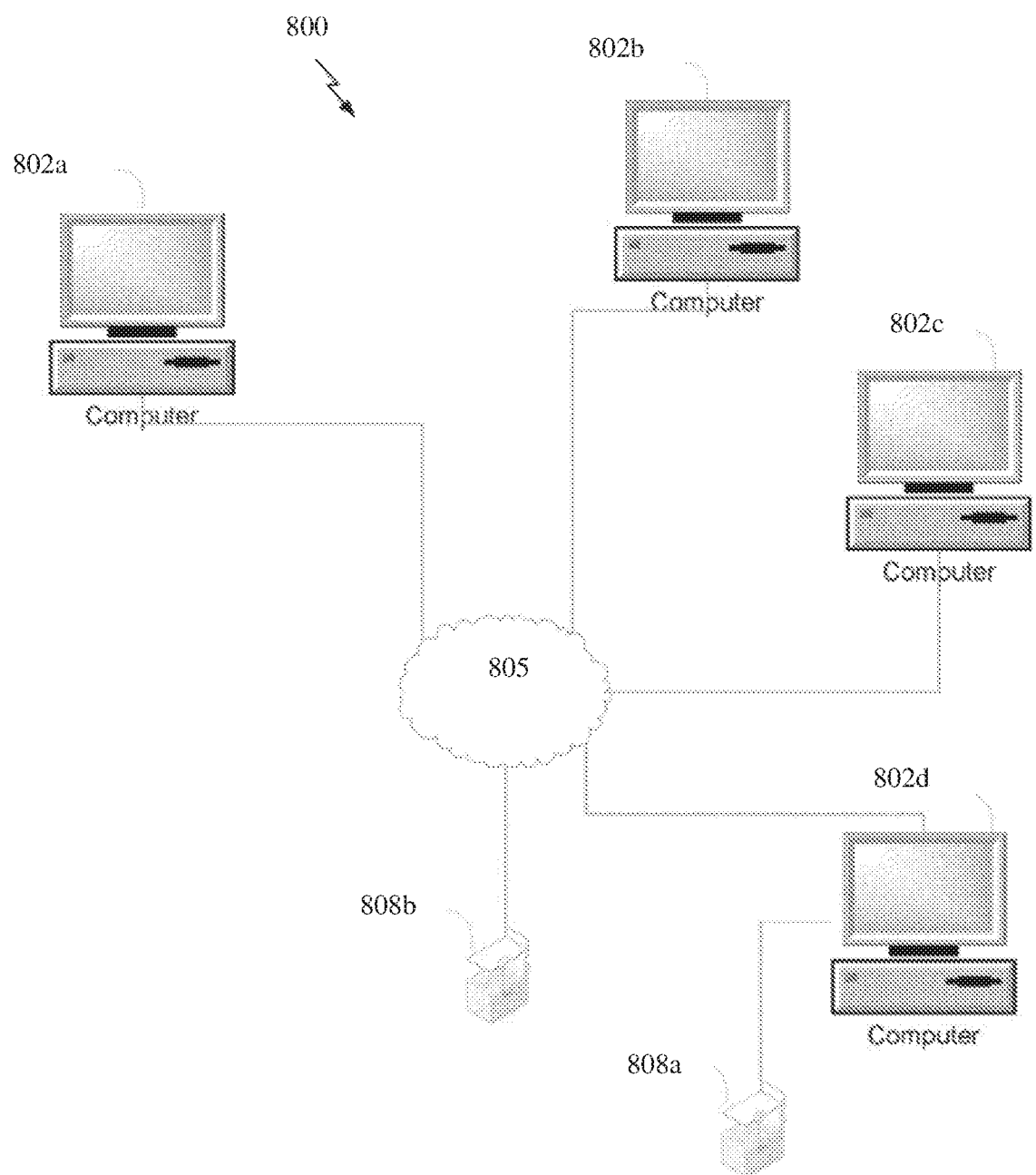
FIG. 8 is an example of a system for designing and manufacturing 3D objects.

Embodiments of the invention may be practiced within a system for designing and manufacturing 3D objects. Turning to FIG. 8, an example of a computer environment suitable for the implementation of 3D object design and manufacturing is shown. The environment includes a system 800. The system 800 includes one or more computers 802a-802d, which can be, for example, any workstation, server, or other computing device capable of processing information. In some aspects, each of the computers 802a-802d can be connected, by any suitable communications technology (e.g., an internet protocol), to a network 805 (e.g., the Internet). Accordingly, the computers 802a-802d may transmit and receive information (e.g., software, digital representations of 3-D objects, commands or instructions to operate an additive manufacturing device, etc.) between each other via the network 805.

The system 800 further includes one or more additive manufacturing devices (e.g., 3-D printers) 808a-808b. As shown the additive manufacturing device 808a is directly connected to a computer 802d (and through computer 802d connected to computers 802a-802c via the network 805) and additive manufacturing device 808b is connected to the computers 802a-802d via the network 805. Accordingly, one of skill in the art will understand that an additive manufacturing device 808 may be directly connected to a computer 802, connected to a computer 802 via a network 805, and/or connected to a computer 802 via another computer 802 and the network 805.

It should be noted that though the system 800 is described with respect to a network and one or more computers, the techniques described herein also apply to a single computer 802, which may be directly connected to an additive manufacturing device 808. Any of the computers 802a-802d may be configured to function as the computing device and/or controller described with respect to FIGS. 1-7. Further, any of the computers 802a-802d may be configured to perform the operations described herein, including the operations 700 described with respect to FIG. 7.

Figure 9:
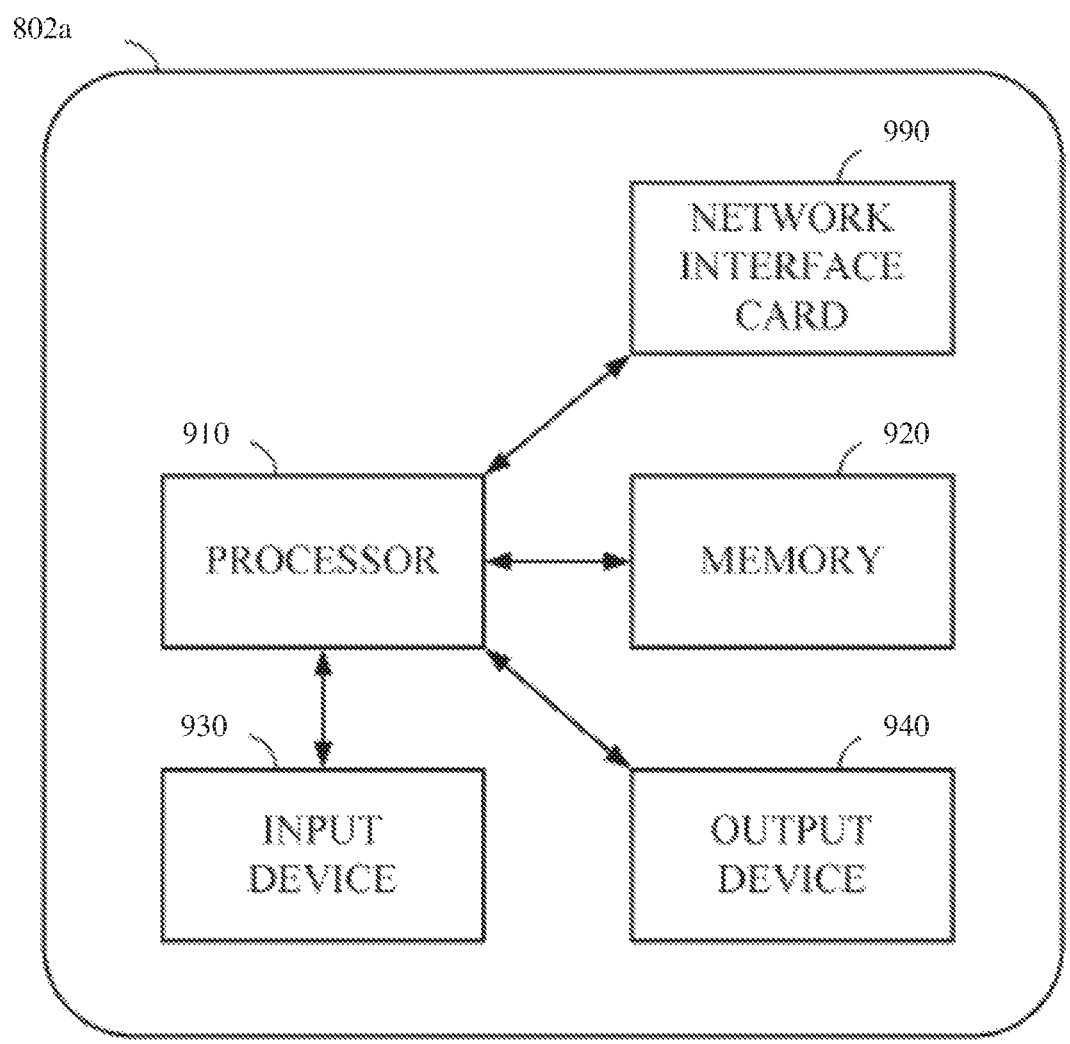
FIG. 9 illustrates a functional block diagram of one example of the computer shown in FIG. 8.

FIG. 9 illustrates a functional block diagram of one example of a computer of FIG. 8. The computer 802a includes a processor 910 in data communication with a memory 920, an input device 930, and an output device 940. In some embodiments, the processor is further in data communication with an optional network interface card 990. Although described separately, it is to be appreciated that functional blocks described with respect to the computer 502a need not be separate structural elements. For example, the processor 910 and memory 920 may be embodied in a single chip.

The processor 910 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 910 can be coupled, via one or more buses, to read information from or write information to memory 920. The processor may additionally, or in the alternative, contain memory, such as processor registers. The memory 920 can include processor cache, including a multi-level hierarchical cache in which different levels have different capacities and access speeds. The memory 920 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 910 also may be coupled to an input device 930 and an output device 940 for, respectively, receiving input from and providing output to a user of the computer 802a. Suitable input devices include, but are not limited to, a keyboard, buttons, keys, switches, a pointing device, a mouse, a joystick, a remote control, an infrared detector, a bar code reader, a scanner, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, additive manufacturing devices, and haptic output devices.

The processor 910 further may be coupled to a network interface card 990. The network interface card 990 prepares data generated by the processor 910 for transmission via a network according to one or more data transmission protocols. The network interface card 990 also decodes data received via a network according to one or more data transmission protocols. The network interface card 990 can include a transmitter, receiver, or both. In other embodiments, the transmitter and receiver can be two separate components. The network interface card 990, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 10:
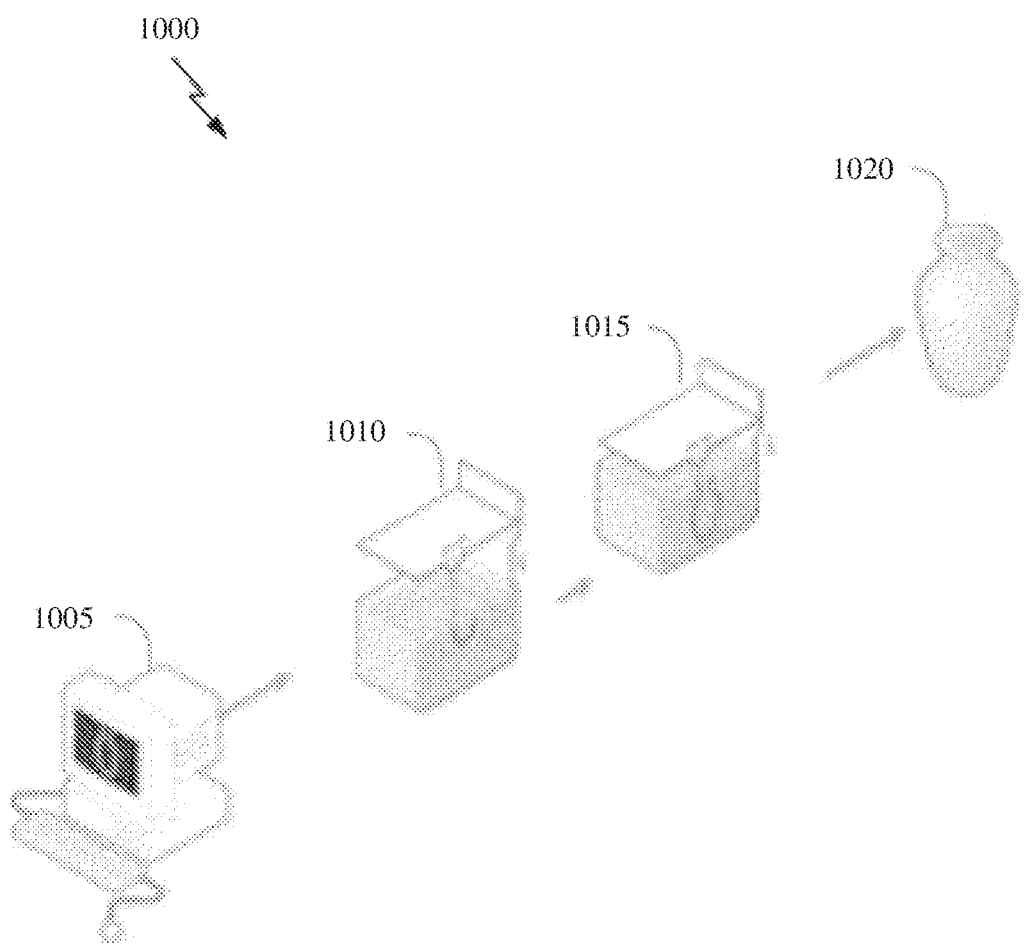
FIG. 10 shows a high level process for manufacturing a 3D object using an additive manufacturing system.

FIG. 10 illustrates a process 1000 for manufacturing a 3-D object or device. As shown, at a step 1005, a digital representation of the object is designed using a computer, such as the computer 802*a*. For example, 2-D or 3-D data may be input to the computer 802*a* for aiding in designing the digital representation of the 3-D object. Continuing at a step 1010, information is sent from the computer 802*a* to an additive manufacturing device, such as additive manufacturing device 808, and the device 808 commences the manufacturing process in accordance with the received information. At a step 1015, the additive manufacturing device 808 continues manufacturing the 3-D object using suitable materials, such as a liquid resin. At a step 1020, the object is finally built.

These suitable materials may include, but are not limited to a photopolymer resin, polyurethane, methyl methacrylate-acrylonitrile-butadiene-styrene copolymer, resorbable materials such as polymer-ceramic composites, etc. Examples of commercially available materials are: DSM Somos® series of materials 7100, 8100, 9100, 9420, 10100, 11100, 12110, 14120 and 15100 from DSM Somos; ABSplus-P430, ABSi, ABS-ESD7, ABS-M30, ABS-M30i, PC-ABS, PC ISO, PC, ULTEM 9085, PPSF and PPSU materials from Stratasys; Accura Plastic, DuraForm, CastForm, Laserform and VisiJet line of materials from 3-Systems; the PA line of materials, PrimeCast and PrimePart materials and Alumide and CarbonMide from EOS GmbH. The VisiJet line of materials from 3-Systems may include Visijet Flex, Visijet Tough, Visijet Clear, Visijet HiTemp, Visijet e-stone, Visijet Black, Visijet Jewel, Visijet FTI, etc. Examples of other materials may include Objet materials, such as Objet Fullcure, Objet Veroclear, Objet Digital Materials, Objet Duruswhite, Objet Tangoblack, Objet Tangoplus, Objet Tangoblackplus, etc. Another example of materials may include materials from the Renshape 5000 and 7800 series. Further, at a step 820, the 3-D object is generated.

Various embodiments disclosed herein provide for the use of computer software being executed on a computing device. A skilled artisan will readily appreciate that these embodiments may be implemented using numerous different types of computing devices, including both general purpose and/or special purpose computing system environments or configurations. Examples of well-known computing systems, environments, and/or configurations that may be suitable for use in connection with the embodiments set forth above may include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. These devices may include stored instructions, which, when executed by a microprocessor in the computing device, cause the computer device to perform specified actions to carry out the instructions. As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

Aspects and embodiments of the inventions disclosed herein may be implemented as a method, apparatus or article of manufacture using standard programming or engineering techniques to produce software, firmware, hardware, or any combination thereof. The term "article of manufacture" as used herein refers to code or logic implemented in hardware or non-transitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

What is claimed is:

1. A method of analyzing a graph representing a three-dimensional lattice structure to identify non-self-supporting areas, the method comprising:
 detecting a line in the graph having an angle with respect to an XY plane that is less than a threshold angle, the line having a graph line length;
 determining one of a beam thickness of a neighboring graph line of the detected line and a connection thickness of a connection between the neighboring graph line and the detected line, wherein the beam thickness is a distance between opposing sides of build material corresponding to the neighboring graph line in a plane including the detected line and a Z-axis, wherein the neighboring graph line intersects the detected line in the plane at a node, wherein the connection thickness corresponds to a distance between opposing sides of build material corresponding to the node in the plane;
 calculating, based on the graph line length and the one of the beam thickness and the connection thickness, an actual length of the detected line;
 determining, based on the actual length, if the detected line meets buildability constraints by determining if the actual length exceeds a maximum self-supporting beam length based on a type of build material; and at least one of:
- altering a depiction of the detected line in a user interface based on the actual length exceeding the maximum self-supporting beam length;
- increasing the connection thickness to reduce the actual length based on the actual length exceeding the maximum self-supporting beam length;
- adjusting a position of the node to reduce the actual length based on the actual length exceeding the maximum self-supporting beam length; or
- increasing the beam thickness to reduce the actual length based on the actual length exceeding the maximum self-supporting beam length.

2. The method of claim 1, wherein the detected line is representative of a horizontal beam in the lattice structure.

3. The method of claim 1, wherein calculating the actual length of the detected line comprises subtracting a value based on the beam thickness of the neighboring graph line from the graph line length.

4. The method of claim 1, wherein calculating the actual length of the detected line comprises subtracting the connection thickness from the graph line length.

5. The method of claim 1, wherein the maximum self-supporting beam length is further based on a type of additive manufacturing device to be used in building the lattice structure.

6. The method of claim 1, further comprising adjusting the graph so that the detected line meets the buildability constraints when the detected line does not meet buildability constraints.

7. The method of claim 1, wherein the at least one of comprises the increasing the connection thickness to reduce the actual length.

8. The method of claim 6, wherein adjusting the graph so that the detected line meets the buildability constraints comprises moving the connection between the neighboring graph line and the detected line closer to a second connection between a second neighboring graph line and the detected line.

9. The method of claim 8, wherein adjusting the graph so that the detected line meets the buildability constraints further comprises ensuring that an angle of neighboring beams remains above the threshold angle.

10. A non-transitory computer-readable medium having computer-executable instructions stored thereon, which, when executed by a processor of a computing device, cause the computing device to perform a method of analyzing a graphical representation of a three-dimensional lattice structure to identify non-self-supporting areas, the method comprising:
- detecting a line in the graph having an angle with respect to an XY plane that is less than a threshold angle, the line having a graph line length;
- determining one of a beam thickness of a neighboring graph line of the detected line and a connection thickness of a connection between the neighboring graph line and the detected line wherein the beam thickness is a distance between opposing sides of build material corresponding to the neighboring graph line in a plane including the detected line and a Z-axis, wherein the neighboring graph line intersects the detected line in the plane at a node, wherein the connection thickness corresponds to a distance between opposing sides of build material corresponding to the node in the plane;
- calculating, based on the graph line length and the one of the beam thickness and the connection thickness, an actual length of the detected line;
- determining, based on the actual length, if the detected line meets buildability constraints by determining if the actual length exceeds a maximum self-supporting beam length based on a type of build material; and
- at least one of:
  - altering a depiction of the detected line in a user interface based on the actual length exceeding the maximum self-supporting beam length;
  - increasing the connection thickness to reduce the actual length based on the actual length exceeding the maximum self-supporting beam length;
  - adjusting a position of the node to reduce the actual length based on the actual length exceeding the maximum self-supporting beam length; or
  - increasing the beam thickness to reduce the actual length based on the actual length exceeding the maximum self-supporting beam length.

11. A computing device for analyzing a graph representing a three-dimensional lattice structure to identify non-self-supporting areas, the computing device comprising:
- a memory; and
- a processor configured to:
  - detect a line in the graph having an angle with respect to an XY plane that is less than a threshold angle, the line having a graph line length;
  - determine one of a beam thickness of a neighboring graph line of the detected line and a connection thickness of a connection between the neighboring graph line and the detected line, wherein the beam thickness is a distance between opposing sides of build material corresponding to the neighboring graph line in a plane including the detected line and a Z-axis, wherein the neighboring graph line intersects the detected line in the plane at a node, wherein the connection thickness corresponds to a distance between opposing sides of build material corresponding to the node in the plane;
  - calculate, based on the graph line length and the one of the beam thickness and the connection thickness, an actual length of the detected line;
  - determine, based on the actual length, if the detected line meets buildability constraints by determining if the actual length exceeds a maximum self-supporting beam length based on a type of build material; and
  - at least one of:
    - alter a depiction of the detected line in a user interface based on the actual length exceeding the maximum self-supporting beam length;
    - increase the connection thickness to reduce the actual length based on the actual length exceeding the maximum self-supporting beam length;
    - adjust a position of the node to reduce the actual length based on the actual length exceeding the maximum self-supporting beam length; or
    - increase the beam thickness to reduce the actual length based on the actual length exceeding the maximum self-supporting beam length.

12. The method of claim 1, wherein the line in the graph comprises two or more lines connected in sequence, each of which have an angle with respect to the XY plane that is less than the threshold angle, and wherein the graph line length is a sum of lengths of the two or more lines.

* * * * *